US012390034B1

(12) United States Patent
Costello et al.

(10) Patent No.: US 12,390,034 B1
(45) Date of Patent: Aug. 19, 2025

(54) COMPRESSIBLE SPORTS BALL FOR HOLDING AND DELIVERING DRINKS

(71) Applicant: The 19th Hole, LLC, Franklin, TN (US)

(72) Inventors: Gil Costello, Franklin, TN (US); Will Costello, Franklin, TN (US); Tyler Stewart, Franklin, TN (US); Joel Dunham, Franklin, TN (US)

(73) Assignee: The 19th Hole, LLC, Franklin, TN (US)

( * ) Notice: Subject to any disclaimer, the term of this patent is extended or adjusted under 35 U.S.C. 154(b) by 0 days.

(21) Appl. No.: 18/745,314

(22) Filed: Jun. 17, 2024

Related U.S. Application Data

(63) Continuation of application No. 18/659,389, filed on May 9, 2024, now abandoned.

(60) Provisional application No. 63/521,216, filed on Jun. 15, 2023.

(51) Int. Cl.
*B67C 11/02* (2006.01)
*A47G 19/22* (2006.01)

(52) U.S. Cl.
CPC .......... *A47G 19/2227* (2013.01); *B67C 11/02* (2013.01)

(58) Field of Classification Search
CPC .......... B67C 11/02
USPC .......... 220/703
See application file for complete search history.

(56) References Cited

U.S. PATENT DOCUMENTS

| | | | | |
|---|---|---|---|---|
| 5,720,330 A * | 2/1998 | Schmalz, Jr. | B01L 3/0213 222/206 |
| 12,075,932 B1 * | 9/2024 | Sharpnack | B67C 11/02 |
| 2006/0207961 A1 * | 9/2006 | Kurtz | B65D 1/0223 215/382 |
| 2007/0114346 A1 * | 5/2007 | Omps | F16M 11/14 248/181.1 |
| 2015/0069067 A1 * | 3/2015 | Burgess | F25C 1/243 220/553 |

* cited by examiner

*Primary Examiner* — Stephen J Castellano
(74) *Attorney, Agent, or Firm* — Shane Cortesi

(57) ABSTRACT

Novelty drinking items are described. The novelty item may include a ball with a hollow interior, a compressible wall, and a fill hole. One or more slits may extend laterally from the fill hole. The novelty item may be filled with a beverage using a funnel and may sit on a ring-shaped stand.

16 Claims, 6 Drawing Sheets

COMPRESSIBLE SPORTS BALL FOR HOLDING AND DELIVERING DRINKS

BACKGROUND

Technical Field

The present invention relates to novelty items.

Background of the Invention

Drinking on the golf course and sporting events is common, particularly in social rounds.

Golf balls are typically sold in sleeves, which are rectangular shaped packages that are approximately the same width and thickness of a golf ball.

It would be beneficial to create a novelty item that resembled an item typically found on a golf course (such as a golf ball) or associated with a sporting event (e.g., a baseball, soccer ball, football, hockey puck or basketball) that also held drinkable liquid (i.e., a beverage).

DETAILED DESCRIPTION

Figure 1:
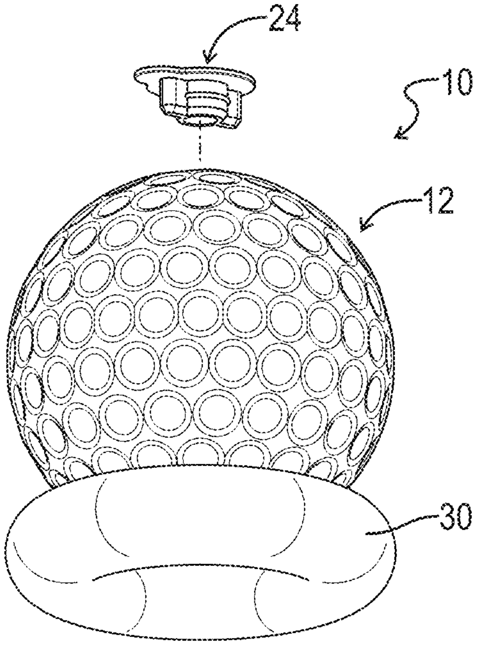
FIG. 1 illustrates a side perspective, exploded view of a ball resting on a ring-shaped stand in accordance with an embodiment of the invention.
Figure 2:
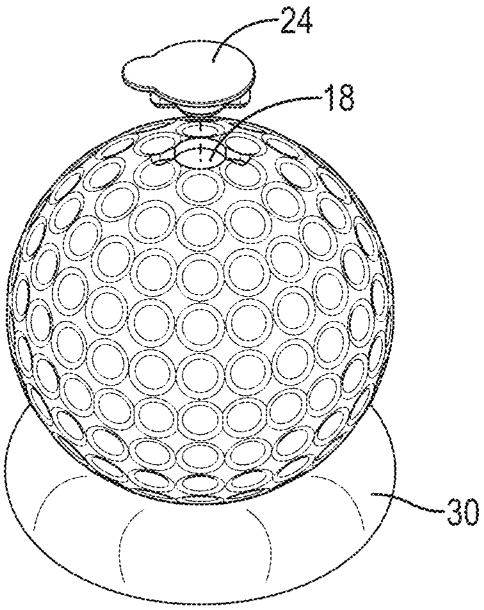
FIG. 2 illustrates another side perspective, exploded view of the ball and stand of FIG. 1.
Figure 3:
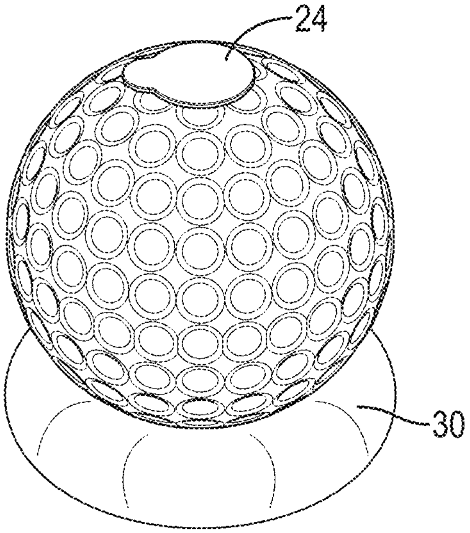
FIG. 3 illustrates a side perspective view of the ball and stand of FIG. 1.
Figure 4:
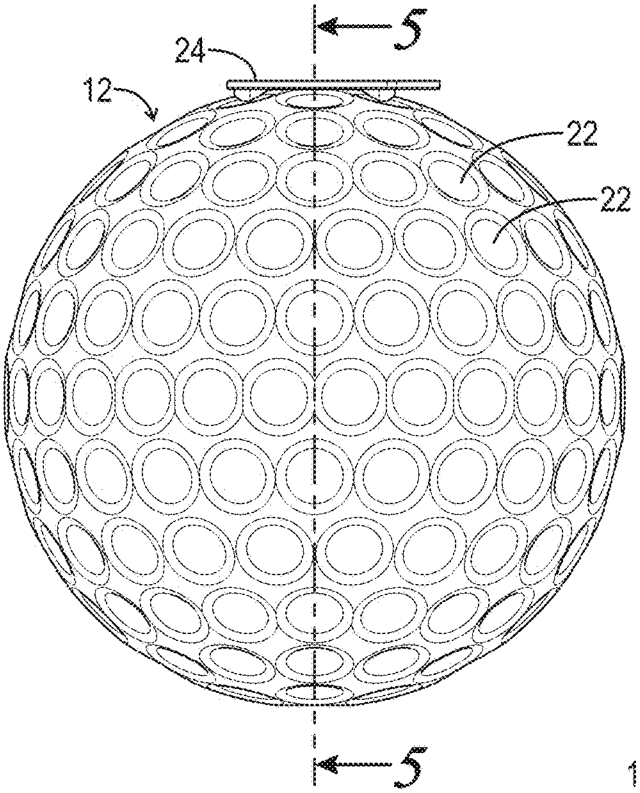
FIG. 4 illustrates a side elevation view of the ball of FIG. 1.
Figure 5:
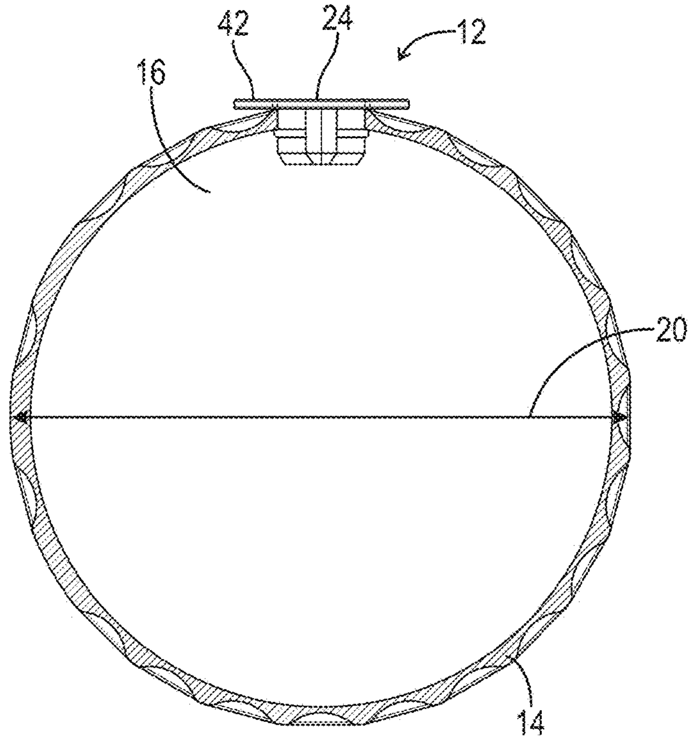
FIG. 5 illustrates a sectional view of the ball of FIG. 1 taken along line 5-5 of FIG. 4.
Figure 6:
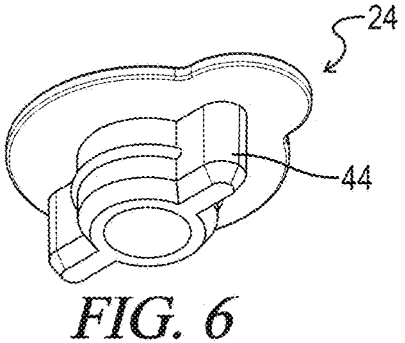
FIG. 6 illustrates a bottom perspective view of the plug of the ball of FIG. 1.

Referring to FIGS. 1-12, the present disclosure provides a novelty item generally designated by the numeral 10. In the drawings, not all reference numbers are included in each drawing for the sake of clarity. Although the drawings are to scale, other dimensions are possible.

Referring further to FIGS. 1-12, in some embodiments, the present disclosure provides a novelty item 10 comprising: a ball 12 or other sporting good-shaped item configured to hold a liquid. In a preferred embodiment, the ball 12 resembles a golf ball, baseball, soccer ball, football, or basketball. However, shapes other than balls may be used such as a hockey puck. In a preferred embodiment, as shown in FIGS. 1-12, the ball 12 is spherical in shape, has dimples 22 and resembles a golf ball.

Figure 7:
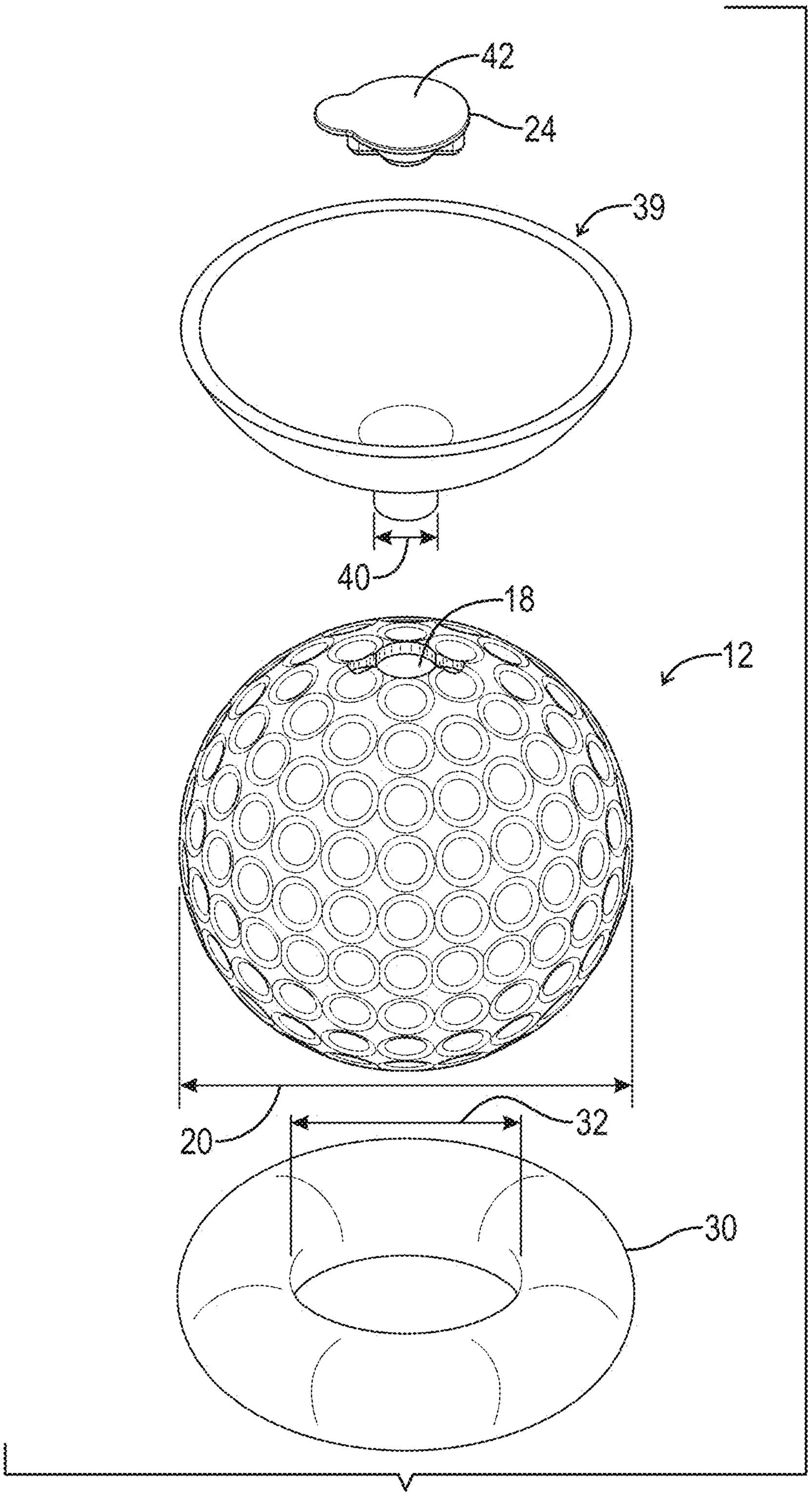
FIG. 7 illustrates a side perspective, exploded view of the ball and stand of FIG. 1 with a funnel.
Figure 8:
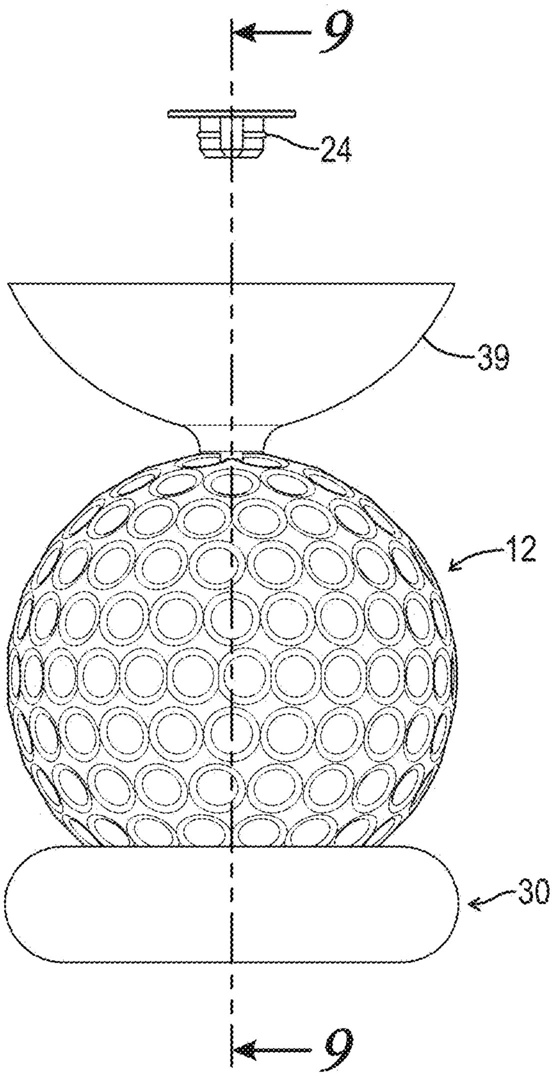
FIG. 8 illustrates a side elevation view of the ball, stand and funnel of FIG. 7 with the tip of the funnel placed in the fill hole of the ball.
Figure 9:
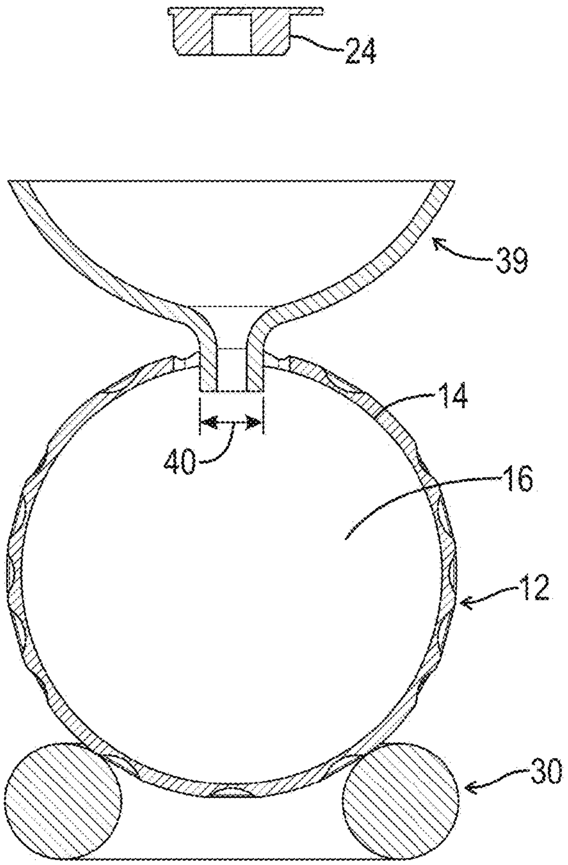
FIG. 9 illustrates a sectional view of the ball, stand and funnel of FIG. 8 taken along line 9-9 of FIG. 8.
Figure 10:
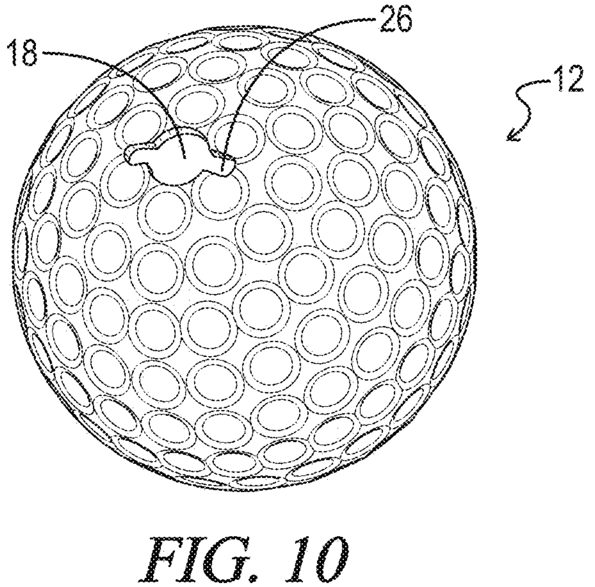
FIG. 10 illustrates a side perspective view of the ball of FIG. 1 with the plug removed.
Figure 11:
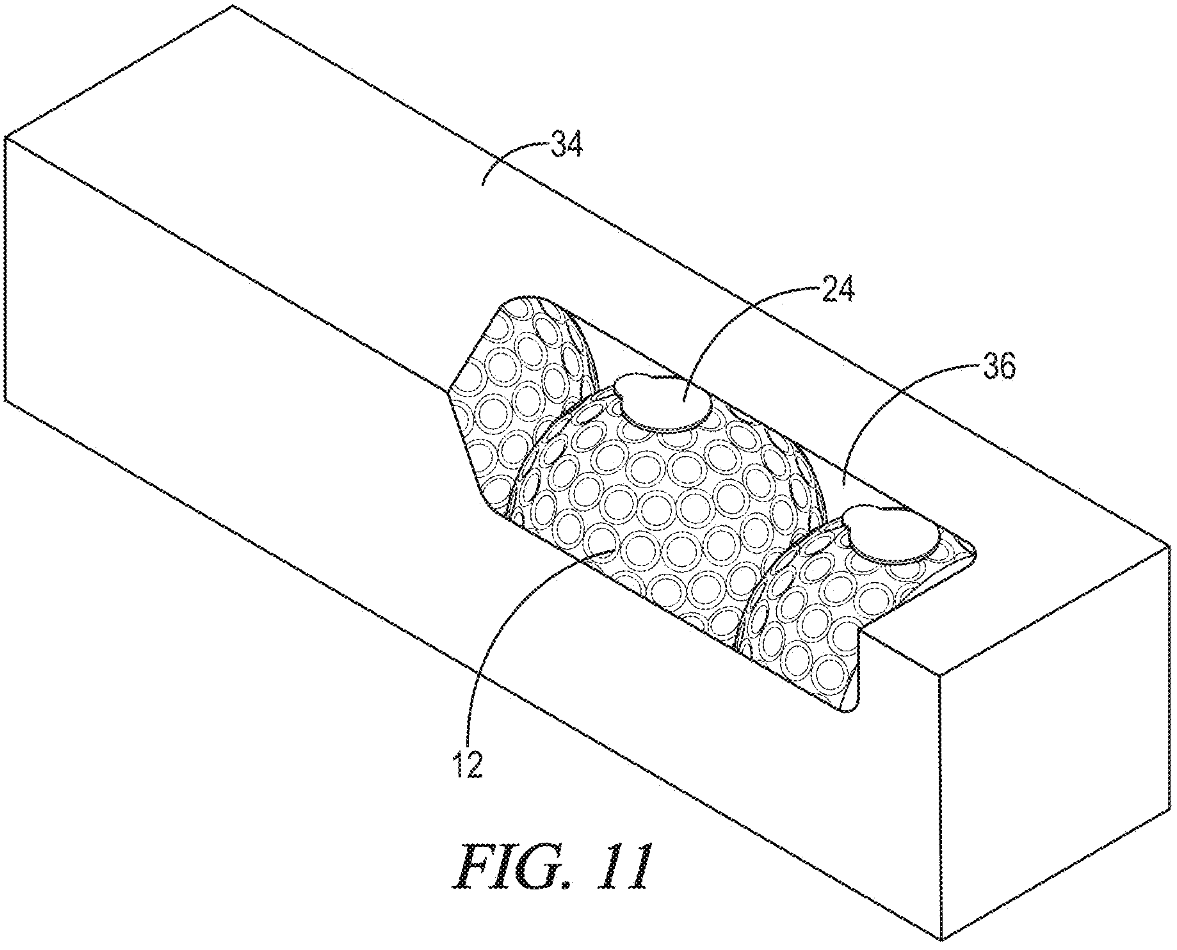
FIG. 11 illustrates a side perspective view of a package resembling a sleeve of golf balls holding balls, a funnel and a ring-shaped stand in accordance with an embodiment of the present invention.
Figure 12:
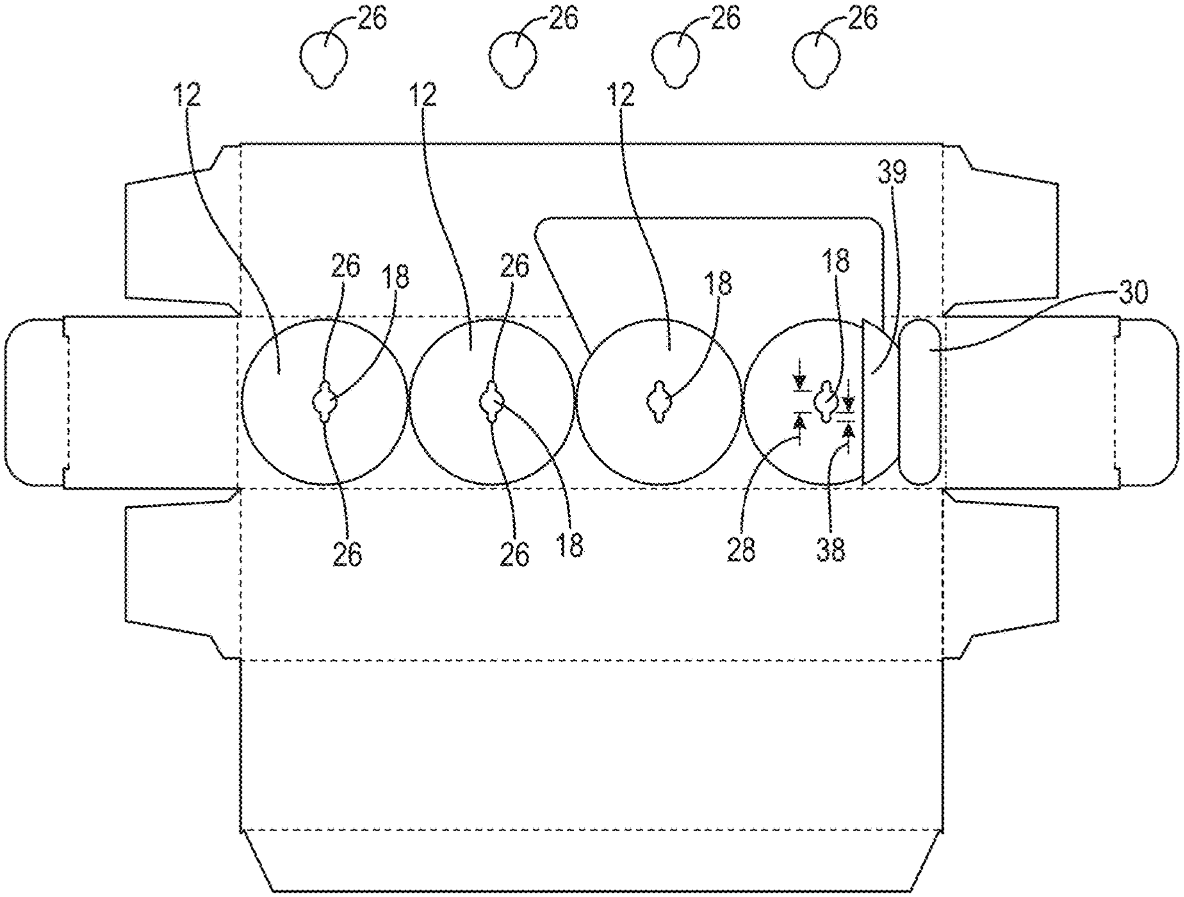
FIG. 12 illustrates a top, exploded sectional view of the packaging, balls, funnel and stand of FIG. 11.

Optionally, the ball 12 or other sporting good-shaped item comprises a compressible wall 14 surrounding a hollow interior 16 that is configured to hold a drinkable liquid. Optionally, the compressible wall 14 comprises a fill hole 18 in fluid communication with the hollow interior 16. Optionally, the novelty item 10 comprises one or more of the following features (in any combination):

a) a diameter 20 of between about 1 and about 3 inches and dimples 22 located on the compressible wall 14 (so that it resembles a golf ball, as shown in FIGS. 1-12);

b) one or more slits 26, which are optionally adjacent the fill hole 18 to allow air to enter the hollow interior 16 when a user is drinking from the fill hole 18 (optionally the slits 26 are located on opposite sides of the fill hole 18, as best seen in FIGS. 10 and 12);

c) a plug 24, sticker or other seal covering the fill hole 18 and optionally the one or more slits 26, as shown in FIGS. 1-12;

d) a funnel 39 comprising a funnel tip configured to protrude at least partially into the fill hole 18 to allow a user to pour a liquid into the hollow interior 16 through the fill hole 18, as shown in FIGS. 7-9 (optionally, the funnel tip diameter 40 is less than the fill hole diameter 28);

e) wherein the fill hole 18 is circular and has a diameter 28 of from about 0.1 to about 0.3 inches, as best seen in FIGS. 10 and 12;

f) wherein, due to for example, air pressure and surface tension of the liquid, the ball 12 or other sporting good-shaped item is configured to only dispense liquid located in the hollow interior 16 only when the compressible wall 14 is squeezed/compressed;

g) a ring-shaped stand 30 that the ball 12 rests on (optionally, the inner diameter/width 32 of the ring 30 is less than the outer diameter/width 20 of the ball 12 or other sporting good-shaped item, as seen in FIGS. 1-3, and 7-9); and h) a rectangular package 34 resembling a sleeve of golf balls that may include a plurality of balls 12 (e.g. 3 or 4 stacked on top of each other), the stand 30, and funnel 39, and may have a window 36 on one or more faces of the package 34, as shown in FIG. 11).

Optionally, the compressible wall 16 is comprised of a food-safe plastic. A food-safe plastic that is preferred for the compressible wall 16 is polyethylene terephthalate glycol (PETG). Optionally, the funnel 39 and stand 30 are also comprised of a food-safe plastic. A food-safe plastic that is preferred for the funnel 39 and stand 30 is acrylonitrile butadiene styrene.

The novelty item 10 may be used in any suitable method. For example, the method may include a) providing the novelty item 10 with a liquid located in the hollow interior 16; b) optionally holding the novelty item 10 in a user's hand and placing the user's mouth over the fill hole 18 (optionally without covering the slits 26); and c) compressing/squeezing the compressible wall 14 (e.g., with the user's thumb or fingers) to dispense the liquid into the user's mouth. Optionally, the method comprises adding a liquid to the hollow interior 16 optionally using the funnel 39 prior to step a). Optionally, the method further comprises removing the seal 24 or puncturing the seal 24 with for example a golf tee before step b).

PARTS LIST

Novelty item 10

Ball 12

Compressible wall 14
Hollow interior 16
Fill hole 18
Ball diameter 20
Dimples 22
Seal 24
Slits 26
Fill hole diameter 28
Stand 30
Inner diameter of stand 32
Packaging 34
Packaging window 36
Slit length 38
Funnel 39
Funnel tip diameter 40
Plug top 42
Plug protrusion 44

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about", and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A novelty item comprising:

a) a ball configured to hold a liquid comprising:

i) a compressible wall surrounding a hollow interior, the hollow interior configured to hold a liquid, the compressible wall comprising a fill hole in fluid communication with the hollow interior, the fill hole circular in shape and comprising a diameter of from about 0.1 to about 0.3 inches;

ii) two slits extending laterally from the fill hole, each slit having a length of 0.05 to about 0.15 inches, wherein the lengths of the slits are less than the diameter of the fill hole;

iii) a seal covering the fill hole; and b) a funnel comprising a funnel tip configured to protrude at least partially into the fill hole to allow a user to pour a liquid into the hollow interior through the fill hole, wherein the funnel tip is circular in shape and comprises a diameter that is less than the diameter of the fill hole, and further wherein the ball is configured to only dispense liquid located in the hollow interior out of the fill hole only when the compressible wall is squeezed.

2. A novelty item comprising:

a) a ball configured to hold a liquid comprising:

i) a compressible wall surrounding a hollow interior, the hollow interior configured to hold a liquid, the compressible wall comprising a fill hole in fluid communication with the hollow interior, the fill hole circular in shape and comprising a diameter;

ii) one or more slits extending laterally from the fill hole;

iii) a seal covering the fill hole and one or more slits, wherein the seal is in the form of a removable plug comprising a flat top and a bottom comprising a protrusion configured to mate with the one or more slits and fill hole; and b) a funnel comprising a funnel tip configured to protrude at least partially into the fill hole to allow a user to pour a liquid into the hollow interior through the fill hole, wherein the funnel tip is circular in shape and comprises a diameter that is less than the diameter of the fill hole, and further wherein the ball is configured to only dispense liquid located in the hollow interior out of the fill hole only when the compressible wall is squeezed.

3. The novelty item of claim 2 wherein, when the funnel tip is inserted in the fill hole, the funnel tip covers the fill hole but not the one or more slits.

4. The novelty item of claim 2 wherein the ball is the shape of a golf ball and comprises an outer diameter of between about 1 and about 3 inches and a plurality of dimples distributed about an exterior surface of the compressible wall.

5. The novelty item of claim 2 further comprising a ring-shaped stand that the ball rests on, the ring-shaped stand having an inner diameter that is less than the outer diameter of the ball.

6. The novelty of item of claim 2 wherein the ball comprises two slits extending laterally from the fill hole.

7. The novelty item of claim 6 wherein the fill hole has a diameter of from about 0.1 to about 0.3 inches.

8. The novelty item of claim 7 wherein the slits have a length of 0.05 to about 0.15 inches, and further wherein the fill hole length is less than a diameter of the fill hole.

9. The novelty item of claim 2 wherein the compressible wall is comprised of a food-safe plastic.

10. The novelty item of claim 2 wherein the compressible wall is comprised of polypropylene.

11. The novelty item of claim 2 wherein the compressible wall is comprised of polyethylene terephthalate glycol (PETG).

12. A method of drinking from a novelty item comprising the steps of:

a) providing the novelty item of claim 2 the hollow interior comprising a beverage;

b) placing a user's mouth over the fill hole; and c) compressing the compressible wall to dispense the beverage out of the fill hole into the user's mouth.

13. The method of claim 12 wherein step b) comprises placing a user's mouth over the fill hole without covering the one or more slits.

14. The method of claim 12 wherein the method further comprises allowing air to enter the hollow interior through the one or more slits while the beverage is dispensed out of the fill hole.

15. The method of claim 12 wherein the method further comprises removing or puncturing the seal prior to step b).

16. The method of claim 12 wherein the method further comprises adding the beverage to the hollow interior using the funnel prior to step a).

* * * * *